United States Patent [19]
Kurogane

[11] Patent Number: 5,652,667
[45] Date of Patent: Jul. 29, 1997

[54] LIQUID CRYSTAL DISPLAY APPARATUS

[75] Inventor: Hideo Kurogane, Zushi, Japan

[73] Assignee: Victor Company of Japan, Ltd., Yokohama, Japan

[21] Appl. No.: 554,289

[22] Filed: Nov. 6, 1995

[30] Foreign Application Priority Data

Feb. 3, 1995 [JP] Japan .................... 7-039145

[51] Int. Cl.$^6$ .................................... G02F 1/1343
[52] U.S. Cl. ........................ 349/42; 349/110; 349/138
[58] Field of Search ...................... 359/59, 67, 74, 359/79

[56] References Cited

U.S. PATENT DOCUMENTS

| | | | |
|---|---|---|---|
| 5,056,895 | 10/1991 | Kahn | 359/59 |
| 5,243,260 | 9/1993 | Vinouze et al. | 359/59 |
| 5,327,001 | 7/1994 | Wakai et al. | 359/59 |

FOREIGN PATENT DOCUMENTS

| | | |
|---|---|---|
| 54-92002 | 7/1979 | Japan . |
| 4-338721 | 11/1992 | Japan . |

*Primary Examiner*—William L. Sikes
*Assistant Examiner*—James A. Dudek
*Attorney, Agent, or Firm*—Michael N. Meller

[57] ABSTRACT

A liquid crystal display device is provided by forming an optical blocking layer which blocks intensive incident light leaking into switching elements. A plurality of switching elements 1 is formed on a substrate 10. A first electrode 2 is connected to and positioned over the switching element. A storage capacitor 3 is connected and positioned under the first electrode. An optical reflector 15 is formed on the first electrode. A transparent second electrode 4 is spaced apart from the optical reflector. A layer of liquid crystal material 5 is positioned between the optical reflector and the second electrode. A substantially nonconductive optical blocking layer 20 is formed between the first electrode and the switching element.

9 Claims, 4 Drawing Sheets

LIQUID CRYSTAL DISPLAY APPARATUS

BACKGROUND OF THE INVENTION

1. Field of the Invention

The present invention relates to a liquid crystal dispaly apparatus and more particularly to a matrix liquid crystal display apparatus suitable for an image projecting display system.

2. Description of the Related Art

The related art will be explained with reference to FIGS. 1 and 2.

A liquid crystal material modulates orientation of molecules parallel to each other in large clusters, and has properties of a liquid as well. By applying a voltage to it, the orderly arrangement of the molecules is changed accordingly, and results to change the material's optical characteristics. The one of the applications of these characteristics is known as a liquid crystal display.

The liquid crystal display consists of two kinds of electrodes, one being a common electrode, the other being pixel electrodes that are installed opposing to the common electrode, with a liquid crystal material interposed therebetween. A data signal that is applied to the pixel electrode controls the optical characteristic of the liquid crystal material.

Liquid crystal display device is generally categorized into a transmission display type and a reflex display type. Transmission display type has comparatively a simple optical system, and is easy to produce economically, but has a demerit that the smaller a panel size of transmission display type is, the more increases the area occupation factor of switching transistors that selectively drive pixels of the display, and of electric wirings. As a result, the aperture factor falls down, and the display decreases its brightness.

On the contrary, the reflex display type, as known from the Japanese Patent Publication S57-39422/1982, the Japanese Patent Laid-Open Publication H4-338721/1992 and the U.S. Pat. No. 5,056,895, has a large aperture factor on a small display panel because switching transistors and electric wirings are placed behind the refractive segment electrodes. Accordingly, a reflex display type that is small in its size and packed densely, is suited for a projection type liquid crystal display system.

FIG. 1 shows a schematic diagram of a unit of a reflex liquid crystal display device of prior art which uses a metal oxide semiconductor field effect transistor (MOSFET). Switching element 1 is a MOSFET of which source or drain is connected to both a pixel electrode 2 and a storage capacitor 3. A liquid crystal layer 5 separates the common electrode 4 and the pixel electrode 2 each other. A gate electrode 6 is connected to the gate line Xi which carries control signals. A source electrode or a drain electrode which is not bound to the pixel electrode 2 is connected to the signal line Yj which carries image signals.

This device operates as follows, for example, when the control signal is supplied to a gate electrode 6 through the gate line Xi, a switching element 1 (MOSFET) turns on, and the image signal fed through the signal line Yj passes through the switching element 1 and charges up the storage capacitor 3 and is simultaneously applied to the pixel electrode 2. When the control signal through the gate line Xi becomes down to zero, the charge stored in the storage capacitor 3 will maintain the voltages of the pixel electrode 2.

A liquid crystal 5 is supplied with a differential voltage of the pixel electrode 2 and the common electrode 4. This differential voltage controls the optical transmission coefficient of the liquid crystal 5. Accordingly, by controlling the differential voltages, electric signals are converted to the modulated light.

When a polarized light S is projected in the direction toward the pixel electrode 2 through the common electrode 4, this polarized light S is reflected by an optical reflector to be explained later to become a P-polarization. This reflected light passes through the liquid crystal 5 and the common electrode 4 again. The optical signal is modulated by the light passing through the liquid crystal 5.

An image is formed by arranging such units of pixels in matrix, and scanning the pixels in horizontal and vertical directions. The scanning method is, for example, that the switching elements being along the gate line Xi, are turned on, image signals charging up each capacitors of the pixels, then scanning them in the Y direction.

FIG. 2 shows a sectional view of a unit of pixels which constitutes the integrated matrix image device.

The switching element which is a MOSFET, includes the gate electrode 6, a drain 7, and a source 8. The gate electrode 6 is formed by poly-crystal silicon for example, on a gate insulator 9, and is connected to the gate line Xi, as shown in FIG. 1. The drain 7 is connected to the signal line Yj, as shown in FIG. 1.

The storage capacitor 3 for charging image signals is made by depositing a insulator film 12 such as silicon dioxide inserted between single crystal silicon substrate 10 and a capacitor electrode 11, which capacitor electrode 11 is connected to the source 8. The pixel electrode 2 is formed on a silicon dioxide insulating layer 13, over the storage capacitor 3 and the switching element 1 each other. The pixel electrode 2 is connected to the source 8 electrically through an opening hole 14, and is made on the insulating layer 13 being silicon dioxide for example.

Moreover, an optical reflector 15 which is made by depositing at least two layers of insulating film such as silicon dioxide is deposited on a base structure which includes the substrate 10 and the pixel electrode 2. A first orientation film 16 is also deposited on the optical reflector 15.

A transparent glass 17 opposes to the silicon substrate 10 which includes the base structure, the optical reflector 15, and the first orientation film 16. A transparent common electrode 4 is deposited on the transparent glass 17, and a second orientation film 22 is further deposited on the common electrode 4. The liquid crystal display device is made by enclosing the liquid crystal 5 with the common electrode 4 and the optical reflector 15 which is a part of the base structure.

An incident light 18 which comes from above the transparent glass 17, passes through the liquid crystal 5. After being reflected by the optical reflector 15, the incident light 18 changes to a modulated light 19 and comes out from the liquid crystal image panel.

Upon the gate signal turns off, the storage capacitor 3 becomes an open circuit, and the electric charge therein is discharged slowly through a cutoff resistance of the switching element 1 and a resistance component of the liquid crystal 5, although, this electric leakage is not a problem to the operation of the liquid crystal display device, because the amount of the leakage is so small.

The problem is that the incident light 18 reaches to the switching element 1, penetrating through the optical reflector 15. Most of the incident light 18 is reflected by the optical reflector 15, but a part of the incident light 18 passes through the optical reflector 15 and irradiates the switching element 1 as a leakage light 18A which occurs in the area between pixel electrodes.

When the leakage light 18A irradiates the switching element 1, the switching element 1 turns to conductive state due to photo carriers generated in response to the leakage light 18A. In the case of that the silicon substrate 10 is p-type semiconductor, and the source 8 is n-type, among the photo carriers activated holes flow into the substrate 10, but are harmless. On the contrary, activated electrons flow into the source 3, which depletes the electric charge of the storage capacitor 8 causing the image panel to lose its image signals.

To improve this problem, it is conceivable to form the optical blocking layer between the pixel electrode 2 and the optical reflector 15. But this may cause following two problems, thus is not quite desirable.

One is an increase of required drive voltage because of the added impedance of the optical blocking layer, and another is a decrease of image resolution because of the widened electric field which is caused by the added optical blocking layer.

SUMMARY OF THE INVENTION

Accordingly, it is a general object of the present invention to provide a liquid crystal display device which prevents the photo conduction of the switching element and offers high quality image display by blocking the incident light from leaking into the switching element even though in the case of strong incident light.

Another object of the present invention is to provide a display device which requires a considerably low driving voltage and has a high resolution.

Other objects and further features of the present invention will be apparent from the following detailed description with respect to preferred embodiment of the invention when read in conjunction with the accompanying drawings.

DETAILED DESCRIPTION OF THE PREFERRED EMBODIMENT

Figure 3:
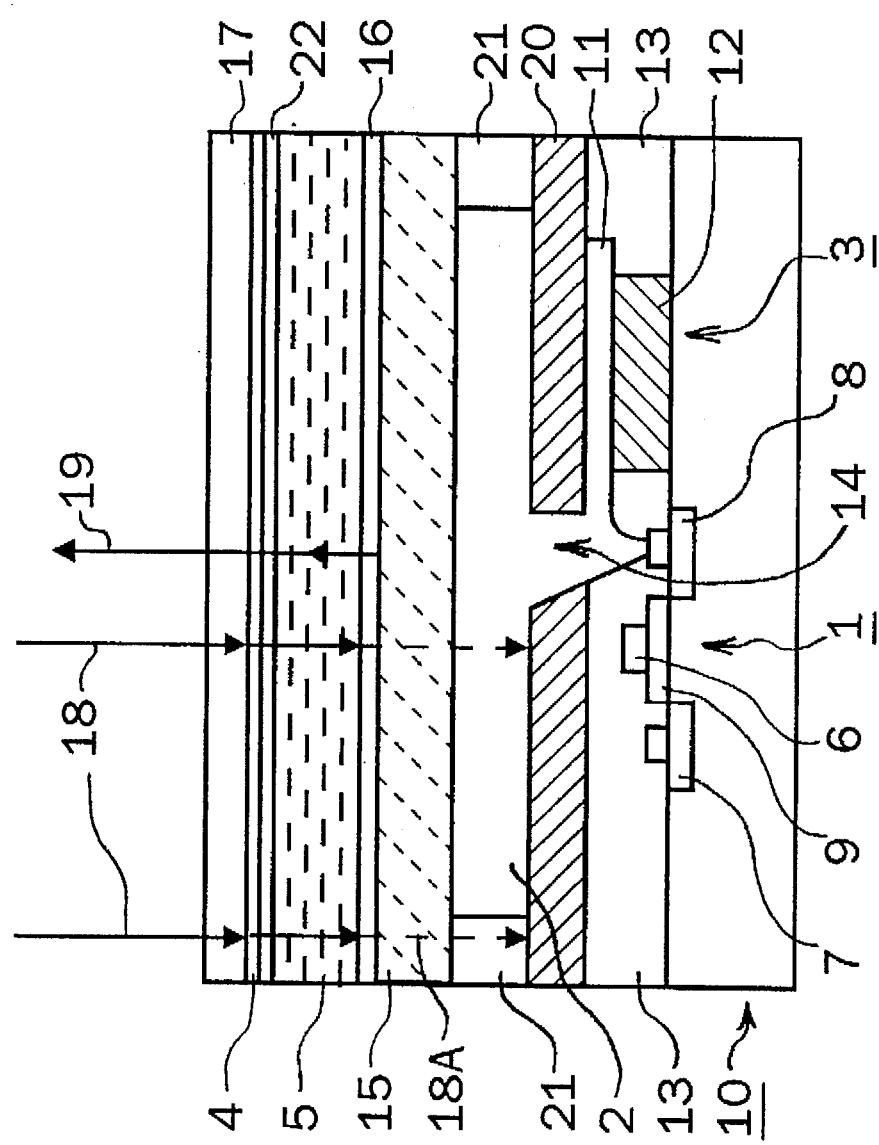
FIG. 3 shows a sectional view of a liquid crystal display device structure, which comprises an integrated matrix display device according to the present invention.

Referring now to FIG. 3, there is shown a sectional view of a unit of pixel which constitutes an integrated matrix display apparatus according to the present invention. It includes a switching element 1 (MOSFET) that comprises a drain 7, a source 8, and a gate electrode 6. The gate electrode 6 is made on a gate insulator 9. The switching element 1 is made on a single crystal silicon substrate 10. The gate electrode 6 is connected to a gate lead line which is made by poly-crystal silicon (not shown). The drain 7 is connected to a signal line (not shown). A storage capacitor 3 is made beside the source 8, by inserting a silicon dioxide insulator film 12 between a capacitor electrode 11 and the silicon substrate 10. The capacitor electrode 11 is connected to the source 8.

A pixel electrode 2, which works as a first display electrode, is formed over the switching element 1 and the storage capacitor 3. An insulating optical blocking layer 20, is formed between the pixel electrode 2 and the switching element 1 togetherwith the storage capacitor 3. In more detail, a silicon dioxide insulating layer 13 covers the switching element 1 and side of the storage capacitor 3, and the optical blocking layer 20 is formed covering the switching element 1, the storage capacitor 3, and the insulating layer 13. The pixel electrode 2 is connected to the source 8 electrically through an opening hole 14 so as to pass through the optical blocking layer 20 and the insulating layer 13 covers the switching element 1. The edge of the pixel electrode 2, which is a frame 21, is filled up with a silicon dioxide insulating film.

The optical blocking layer 20 is used for substantially absorbing a leakage light 18A which will be explained later. The material for the optical blocking layer is cadmium telluride (CdTe) or germanium oxide (GeO) and so on, which can absorb visible rays and infrared rays. An optimum film thickness depends on the material used. In practice, about one micrometer thick film is selected to block the leakage light satisfactorily. The optical blocking layer 20 can be provided by a conventional method of sputtering.

An optical reflector 15, which is made by depositing at least two layers of insulating films of such as silicon dioxide, is formed on the pixel electrode 2 and over a base structure. The optical reflector 15 is about 2 μm thick.

A first orientation film 16 that orients liquid crystal in response to an applied electric field, is formed on the optical reflector 15. The recommendable thickness of the first orientation film 16 is 0.04 to 1 μm.

The silicon substrate 10 is formed in the aforementioned processes.

A transparent glass plate 17 on which a transparent conducting film such as made of indium tin oxide (ITO) for example, is deposited as a common electrode 4, which works as a second display electrode. The transparent glass plate thus made opposes to the silicon substrate 10 as shown in FIG. 3. The common electrode 4 is connected to all of the other common electrodes which are not shown.

A second orientation film 22 which is used for orienting a liquid crystal 5 is formed on all the surface of the common electrode 4. A liquid crystal display device is formed by enclosing the liquid crystal 5 between the first orientation film 16 and the second orientation film 22. Recommendable thickness of the liquid crystal 5 is from 3 to 10 μm.

The liquid crystal display device is a unit cell of a liquid crystal display panel, which comprises a plurality of unit cells in vertical and horizontal matrix.

Figure 1:
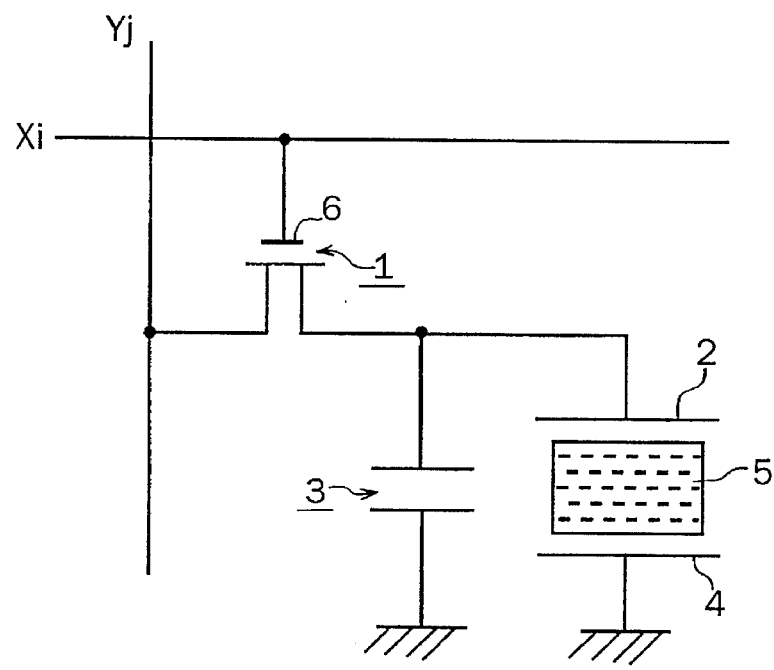
FIG. 1 shows a circuit diagram of an image display pixel according to the prior art.
Figure 2:
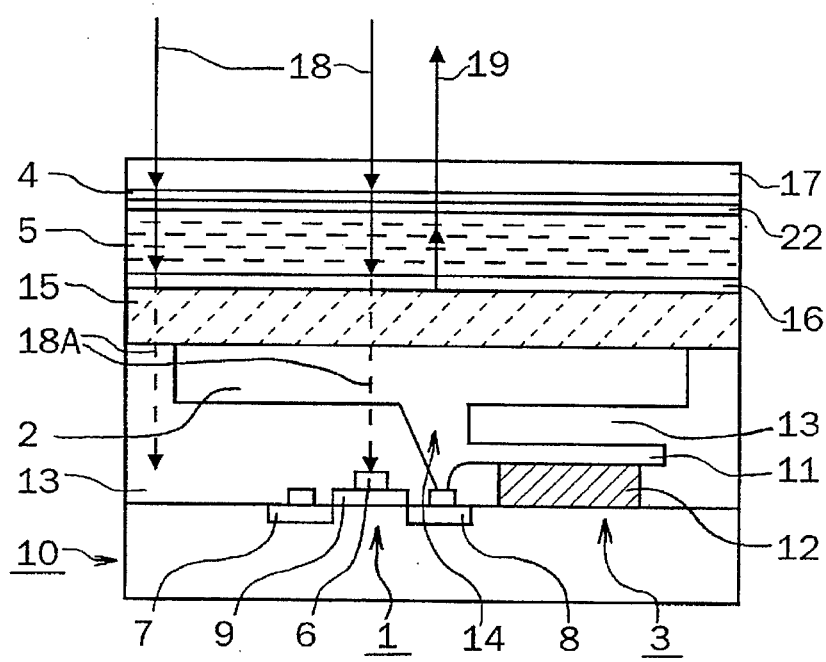
FIG. 2 shows a sectional view of a unit of pixels, which constitutes an integrated matrix display device according to the prior art.

When a scanning voltage is applied to the gate electrode 6 through a gate line Xi (FIG. 1), a channel is formed and conducts electric charges between the drain 7 and the source 8. Thus, the pixel electrode 2 and the storage capacitor 3, which are connected to the source 8, are charged up to the image signal level of the signal line Yj (FIG. 1). When the scanning voltage is off, the channel is decomposed and the source 8 and the pixel electrode 2 are in the state of electric isolation until the scanning voltage is applied again. During the electric isolation, the pixel electrode keeps its voltage by the charge in the storage capacitor 3.

When a s-polarized light, which is an incident light 18 for projection, is projected into the optical reflector 15 through the common electrode 4, and is reflected by the optical reflector 15. This reflected s-polarized light changes to a p-polarized light, and advances through the common electrode 4 again, and comes out of the liquid crystal display device as a modulated light 19.

The most of the incident light 18 are reflected by the optical reflector 15, but a part of the incident light 18 penetrates the optical reflector 15, and gets into the base structure in the area of pixel electrode 2. Especially when the incident lights 18 is intense, the amount of the leakage light 18A through the optical reflector 15 will be large. If there is no optical blocking layer 20, this leakage light 18A will reach to and will effect the switching element 1. Although, in the case of the present invention, the insulating optical blocking layer 20 which is 1 micro-meter in thickness, is formed nearly all over the area of the base structure, except the opening hole 14, between the pixel electrode 2 and the switching element 1. Accordingly, the leakage light 18A which penetrates the optical reflector 15 is almost absorbed by the optical blocking layer 20, and does not reach to the switching element 1.

Thus, the switching element 1 (MOSFET) does not have a photo conduction phenomenon, and the storage capacitor 3 does not leak its charged image signal, electric potential of the pixel electrode 2 is kept to an appropriate value of image signal with respect to the image signal, this liquid crystal display device projects high quality images, and this device suppresses the problem caused by the optical leakage.

By forming the optical blocking layer 20 between the pixel electrode 2 and the switching element 1, the drive voltage of the liquid crystal display device does not require to be high in the present invention. But, in the case of conventional liquid crystal display device that has an optical reflector between the pixel electrode 2 and the common electrode 4, this requires a high drive voltage.

A metal, aluminum for example, is used for the pixel electrode 2. In some cases, the thickness of the pixel electrode is about 0.4 to 1 μm. The metal pixel electrode 2 provides an adequate optical blocking effect to the liquid crystal display device.

In these cases, as the edge of the pixel electrode 2 which is shown as a frame 21, is a main path of the leakage light 18A, some part of the leakage light 18A can reach to the switching element 1, and causes a photo-conduction of the switching element 1.

Figure 4:
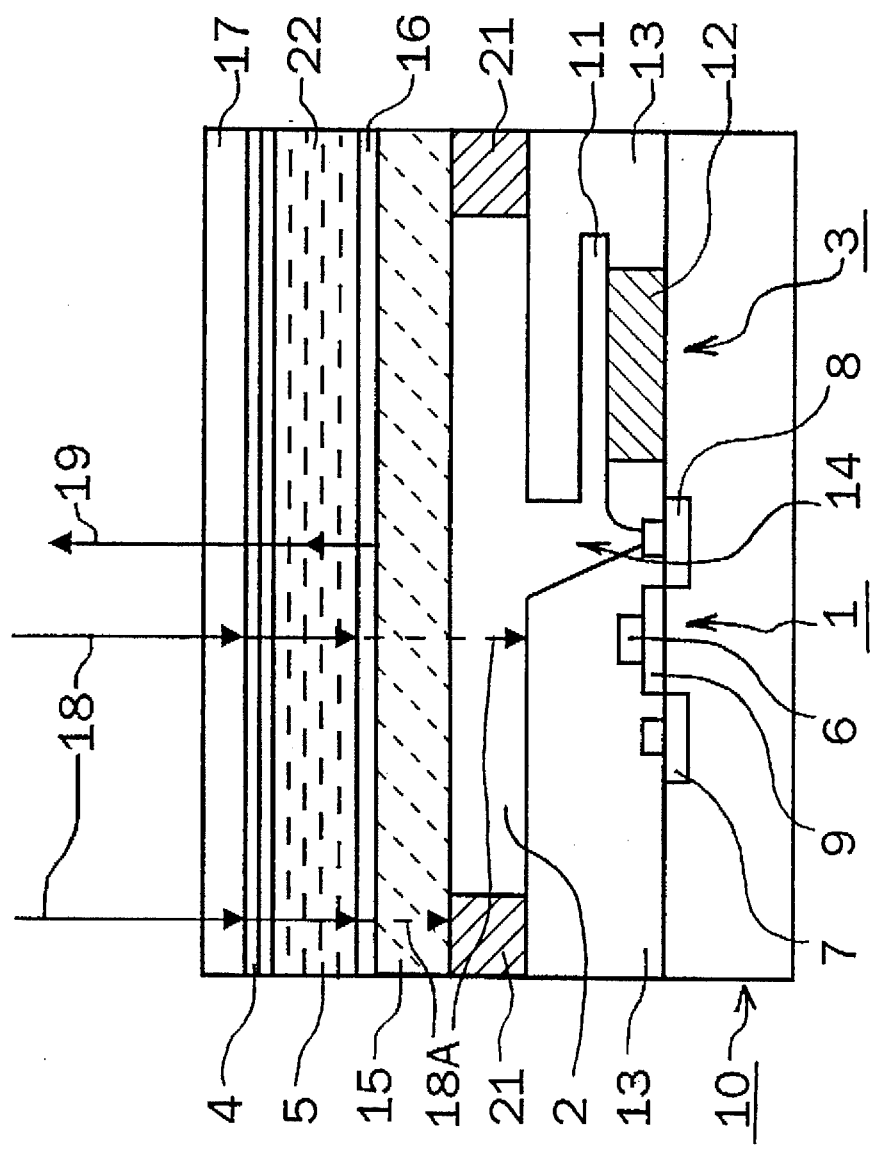
FIG. 4 shows one embodiment of the liquid crystal display device structure, of which an optical blocking layer lies in the edge of the pixel electrode according to the present invention.

In order to avoid this leakage light 18A in the main path more effectively, for example, the frame 21 is made of an optical blocking material, as shown in FIG. 4.

Figure 5:
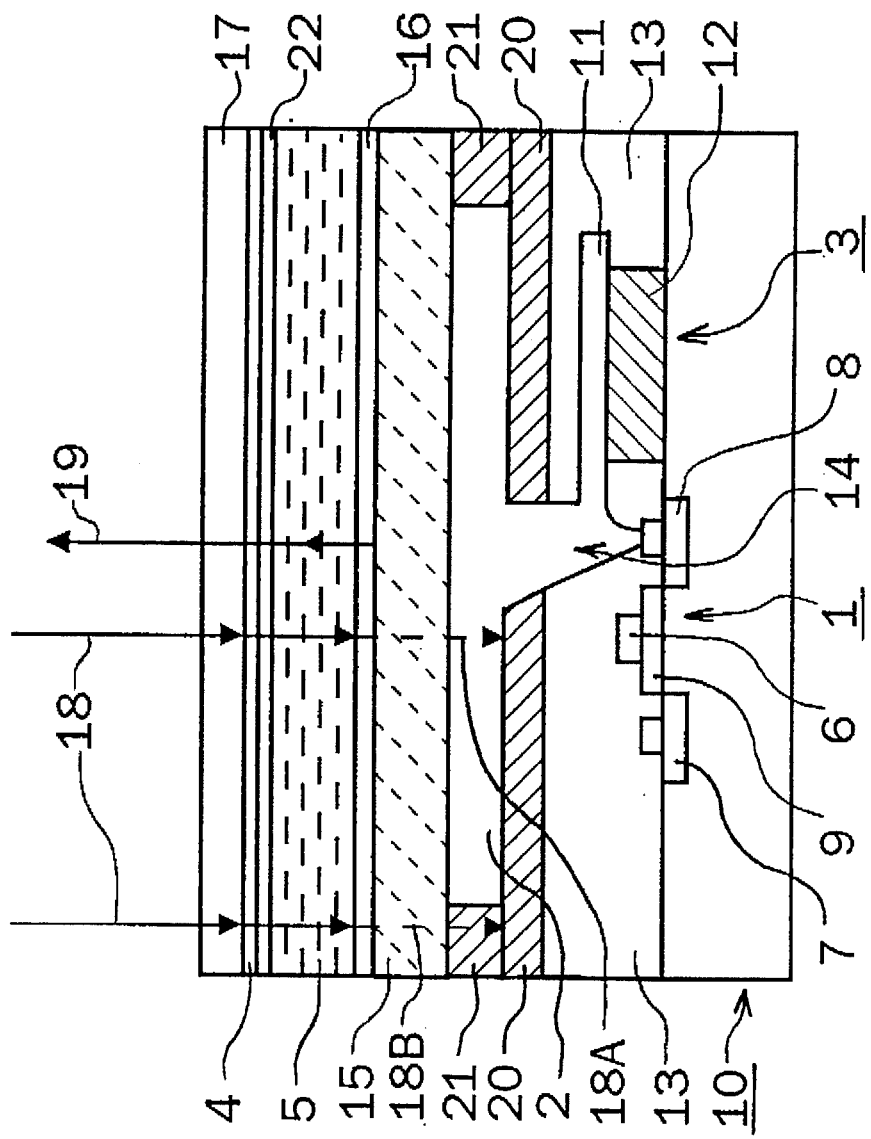
FIG. 5 shows another embodiment of the liquid crystal display device structure according to the present invention, of which the optical blocking layer lies under the edge of the pixel electrodes, and is thick in the edge of the pixel electrode, according to the present invention.

Another improvement is for both the frame 21 and the optical blocking layer 20 to be integrally formed as optical blocking material and placed between the pixel electrode 2 and the switching element 1, as shown in FIG. 5.

In the aforementioned embodiment, the switching element 1 is MOSFET, but other active element such as a thin film transistor (TFT) which can be formed by a conventional skill on a glass substrate will be appropriate.

As shown in the above, the drive voltage of the liquid crystal display device that has the optical blocking layer 20 covering the frame 21, being formed between the pixel electrode 2 and the switching element 1, is adequate to solve the problem in the present invention.

Accordingly, the present invention provides the liquid crystal display device that prevents the photo conduction of the switching element 1 from development and offers high quality image display by blocking the leakage light 18A reaching to the switching element 1 even though in the case of strong incident light, and protects from malfunctioning.

What is claimed is:

1. A liquid crystal display apparatus for displaying an image, comprising:

a substrate;

a plurality of switching elements being formed on said substrate;

a first electrode connected with said switching element and positioned over said switching element;

a storage capacitor connected with said first electrode and positioned under said first electrode;

an optical reflector formed on said first electrode and a frame;

a first orientation film formed on said optical reflector;

a second orientation film spaced apart from said first orientation film;

a second transparent electrode on which said second orientation film is formed;

a layer of liquid crystal material positioned between said first and second orientation films; and substantially nonconductive optical blocking means positioned between said first electrode and said switching element for blocking an incident light from leaking into said switching element.

2. The apparatus of claim 1, wherein said optical blocking layer is formed of cadmium telluride.

3. The apparatus of claim 1, wherein said optical blocking layer is formed of germanium oxide.

4. A liquid crystal display apparatus for displaying an image, comprising:

a substrate;

a plurality of switching elements being formed on said substrate;

a first electrode connected with said switching element and positioned over said switching element;

a frame composition disposed along an edge of said first electrode, with said frame composition being composed of optical blocking insulating material for blocking incident light from leaking into said switching element;

a storage capacitor connected with said first electrode and positioned under said first electrode;

an optical reflector formed on said first electrode;

a first orientation film formed on said optical reflector;

a second orientation film spaced apart from said first orientation film;

a second transparent electrode on which said second orientation film formed; and a layer of liquid crystal material positioned between said first and second orientation films.

5. The apparatus of claim 4, wherein said optical blocking material is cadmium telluride.

6. The apparatus of claim 4, wherein said optical blocking material is germanium oxide.

7. A liquid crystal display apparatus for displaying an image, comprising:

a substrate;

a plurality of switching elements being formed on said substrate;

a first electrode connected with said switching element and positioned over said switching element;

nonconductive optical blocking material formed under said first electrode;

a storage capacitor connected with said first electrode and positioned under said first electrode;

an optical reflector formed on said first electrode;

a first orientation film formed on said optical reflector;

a second orientation film spaced apart from said first orientation film;

a second transparent electrode formed on said second orientation film; and a layer of liquid crystal material positioned between said first and second orientation films.

8. The apparatus of claim 7, wherein said optical blocking material is cadmium telluride.

9. The apparatus of claim 7, wherein said optical blocking material is germanium oxide.

* * * * *